(12) United States Patent
Jester et al.

(10) Patent No.: US 10,485,225 B1
(45) Date of Patent: Nov. 26, 2019

(54) HIVE TOP FEEDER

(71) Applicants: Kevin D. Jester, Mims, FL (US); Pratima Jester, Mims, FL (US)

(72) Inventors: Kevin D. Jester, Mims, FL (US); Pratima Jester, Mims, FL (US)

( * ) Notice: Subject to any disclaimer, the term of this patent is extended or adjusted under 35 U.S.C. 154(b) by 282 days.

(21) Appl. No.: 15/492,611

(22) Filed: Apr. 20, 2017

(51) Int. Cl.
*A01K 53/00* (2006.01)

(52) U.S. Cl.
CPC .................... *A01K 53/00* (2013.01)

(58) Field of Classification Search
CPC ........ A01K 53/00; A01K 47/00; A01K 47/06; A01K 67/033; A01K 67/0333; A01K 67/0335; A01K 67/0336; A01K 67/0337; A01K 67/0339; A01K 1/0356; A01K 5/00; A01K 5/01; A01K 5/0107; A01K 7/00; A01K 31/005; A01K 31/17; A01K 31/18; A01K 31/22; A01K 39/00; A01K 39/02; A01K 39/0206
See application file for complete search history.

(56) References Cited

U.S. PATENT DOCUMENTS

| | | | |
|---|---|---|---|
| 41,711 A | 2/1864 | Markham | |
| 61,514 A | 1/1867 | Buel | |
| 67,680 A | 8/1867 | Slusser | |
| 149,578 A * | 4/1874 | Cuplin | A01K 53/00 449/9 |
| 200,506 A | 2/1878 | Carter | |
| 204,767 A * | 6/1878 | Shuck | A01K 53/00 449/10 |
| 784,072 A | 3/1905 | Roberts | |
| 905,706 A | 12/1908 | Johnson | |
| 1,064,779 A | 6/1913 | Schamu | |
| 1,116,923 A * | 11/1914 | Rahn | A01K 47/06 449/10 |
| 1,353,310 A | 9/1920 | Bonnett | |
| 1,369,190 A | 2/1921 | Dmytro | |
| 1,426,701 A * | 8/1922 | Achenbach | A01K 53/00 119/77 |

(Continued)

FOREIGN PATENT DOCUMENTS

| | | | | |
|---|---|---|---|---|
| FR | 321007 A | * | 12/1902 | ............. A01K 53/00 |
| FR | 794209 A | * | 2/1936 | ............. A01K 53/00 |

(Continued)

OTHER PUBLICATIONS

American Bee Journal, The Beekeeper's Companion Since 1861, vol. 156 No. 12, Dec. 2016, 2 pages.
Mannlake We Know Bees, An Employee Owned Company, 2016, 5 pages.

*Primary Examiner* — Kathleen I Alker
(74) *Attorney, Agent, or Firm* — Brian S. Steinberger; Hilary F. Steinberger; Law Offices of Brian S. Steinberger, P.A.

(57) ABSTRACT

Systems, devices, and methods for providing a hive top feeder assembly with a feeder housing that can attach and attach to a top of a bee hive box/container, with a downwardly protruding entrance cone with or without locking arms/wings that can attach within an opening in the hive box/container. The feeder housing can have a hollow feeder cone and a sloped ladder to allow bees to climb up and down steps to reach and consume syrup from a syrup reservoir inside the feeder housing, followed by reversing their path to go down to the hive box/container to later make honey.

17 Claims, 17 Drawing Sheets

(56) References Cited

U.S. PATENT DOCUMENTS

| | | | |
|---|---|---|---|
| 1,502,278 A | 7/1924 | Stevens | |
| 2,001,463 A * | 5/1935 | Kehrle | A01K 53/00 449/9 |
| 2,446,346 A | 8/1948 | Stoller | |
| 2,496,285 A | 2/1950 | Goebel | |
| 2,539,633 A | 1/1951 | Morrill | |
| 2,611,140 A * | 9/1952 | Goble | A01K 53/00 119/77 |
| 3,343,186 A * | 9/1967 | Dunand | A01K 47/00 449/30 |
| 3,478,722 A | 11/1969 | Falcone et al. | |
| 3,526,913 A | 9/1970 | Warner | |
| 3,704,471 A | 12/1972 | Bielby | |
| 3,776,195 A * | 12/1973 | Willinger | A01K 7/02 119/72.5 |
| 3,835,487 A | 9/1974 | Grigg | |
| 4,053,101 A | 10/1977 | Hart, Jr. | |
| 4,135,265 A | 1/1979 | Van De Kerkof | |
| 4,214,329 A | 7/1980 | Kozlowicz | |
| 4,233,941 A | 11/1980 | Webster | |
| 4,250,581 A * | 2/1981 | Kindall | A01K 53/00 449/9 |
| 4,322,862 A | 4/1982 | Beuthling | |
| 4,333,189 A | 6/1982 | Mentzer et al. | |
| 4,497,433 A | 2/1985 | Wischusen, III | |
| 4,524,476 A | 6/1985 | Adams, IV | |
| 5,211,597 A | 5/1993 | Scott et al. | |
| 5,348,511 A | 9/1994 | Gross et al. | |
| 5,461,822 A | 10/1995 | Green et al. | |
| 5,509,846 A | 4/1996 | Kueneman et al. | |
| 5,983,557 A | 11/1999 | Perich et al. | |
| 6,042,453 A | 3/2000 | Varni et al. | |
| 8,475,227 B2 | 7/2013 | Volby | |
| 8,814,630 B2 | 8/2014 | Rittberger | |
| 2006/0185602 A1 * | 8/2006 | Nock | A01K 39/012 119/51.01 |
| 2007/0145107 A1 | 6/2007 | Figueroa | |
| 2008/0307695 A1 | 12/2008 | Bernard | |
| 2014/0335760 A1 | 11/2014 | Huvermann et al. | |
| 2015/0028090 A1 | 1/2015 | Justice | |
| 2015/0140897 A1 | 5/2015 | Linder et al. | |
| 2016/0157467 A1 | 6/2016 | Banta | |
| 2017/0332608 A1 | 11/2017 | Pedersen | |

FOREIGN PATENT DOCUMENTS

| | | | |
|---|---|---|---|
| FR | 2342654 | 9/1977 | |
| FR | 2578389 | 9/1986 | |
| FR | 2585215 A1 * | 1/1987 | A01K 51/00 |
| FR | 2597715 A1 * | 10/1987 | A01K 53/00 |
| FR | 2688381 | 9/1993 | |
| FR | 2839613 | 11/2003 | |
| FR | 2859598 | 3/2005 | |
| GB | 462197 | 3/1937 | |
| GB | 581253 A * | 10/1946 | A01K 53/00 |
| GB | 714466 A | 8/1954 | |
| GB | 907963 A | 10/1962 | |
| KR | 101400740 | 5/2014 | |
| KR | 101667628 | 10/2016 | |

* cited by examiner

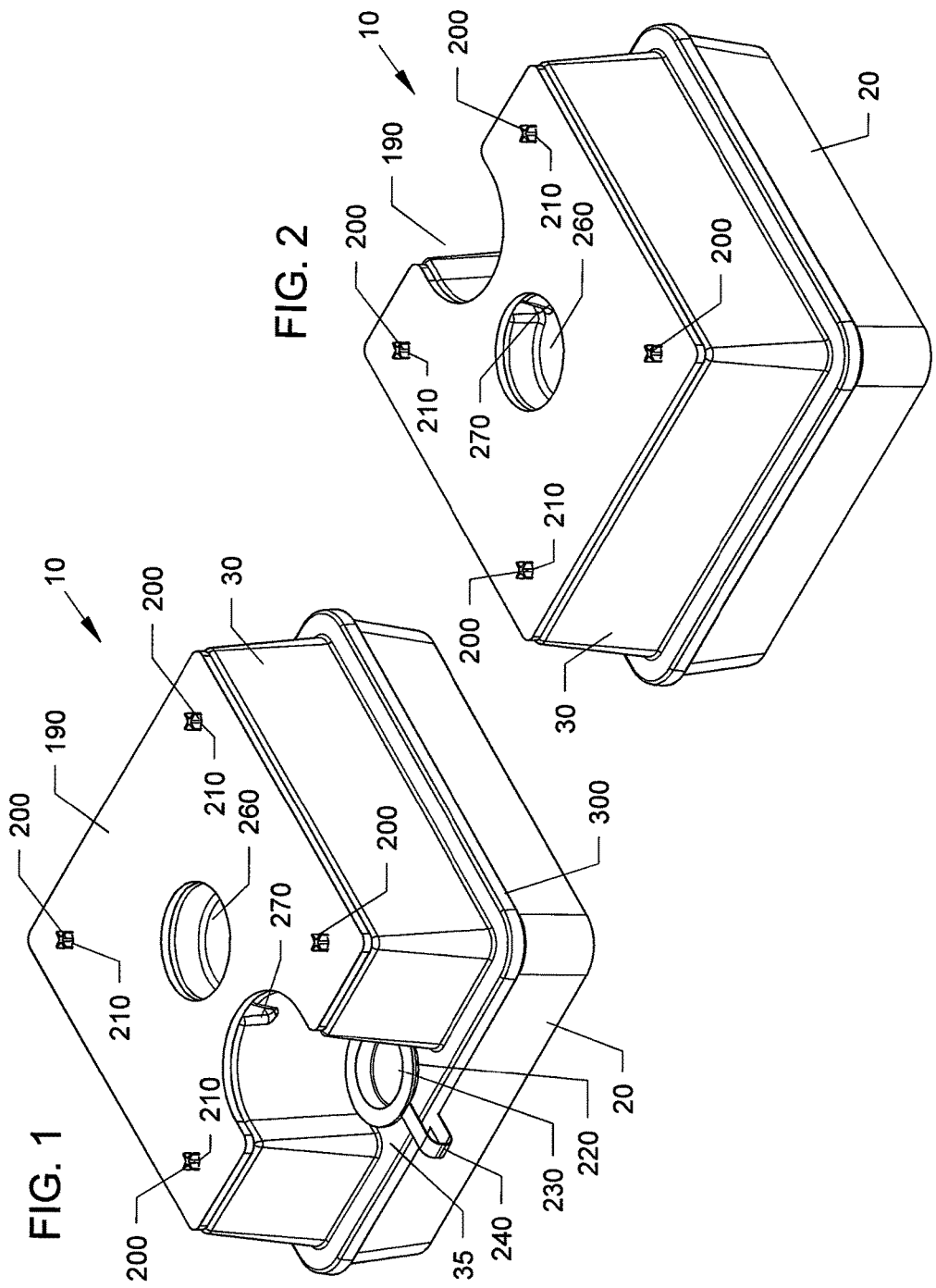

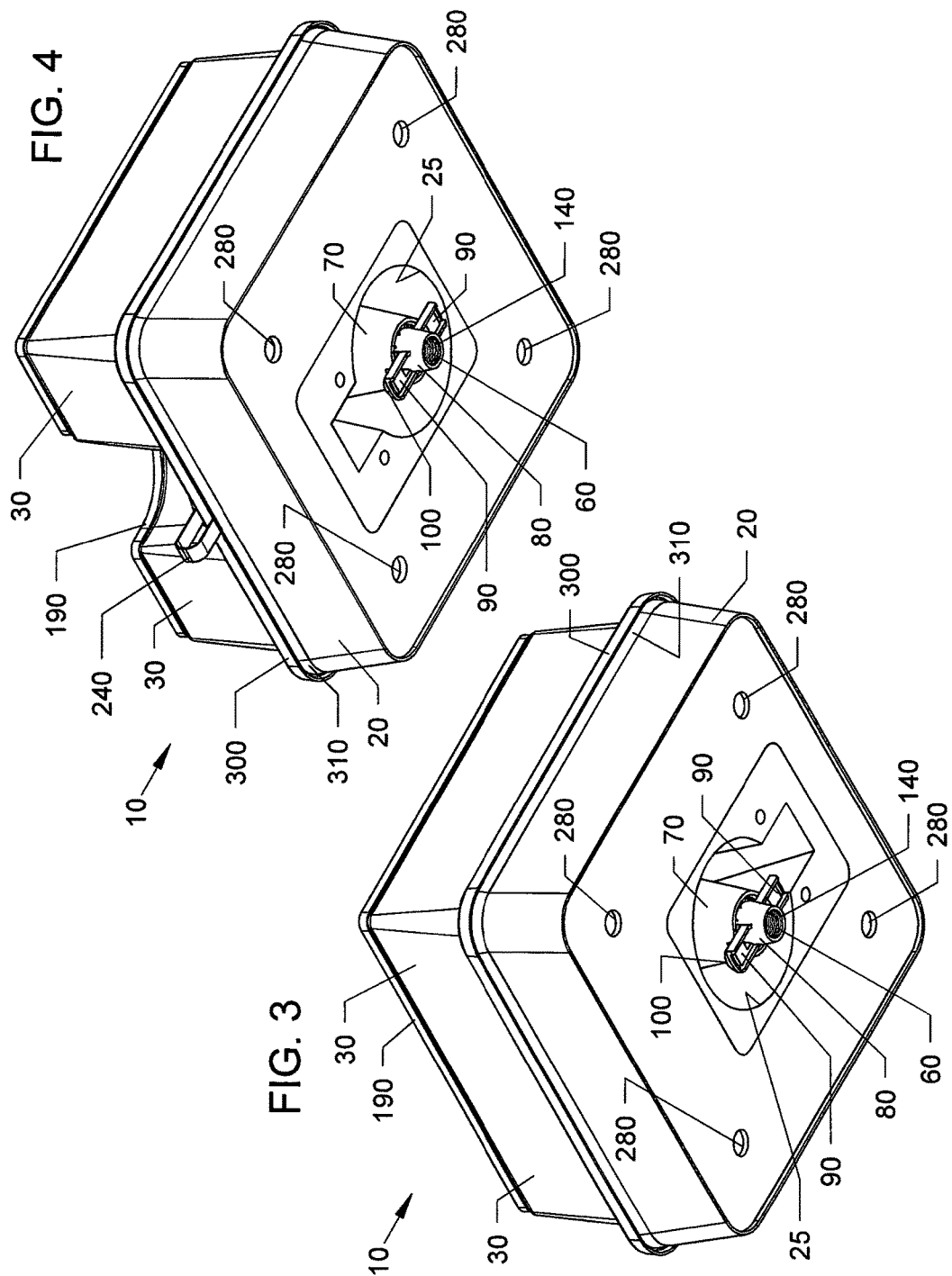

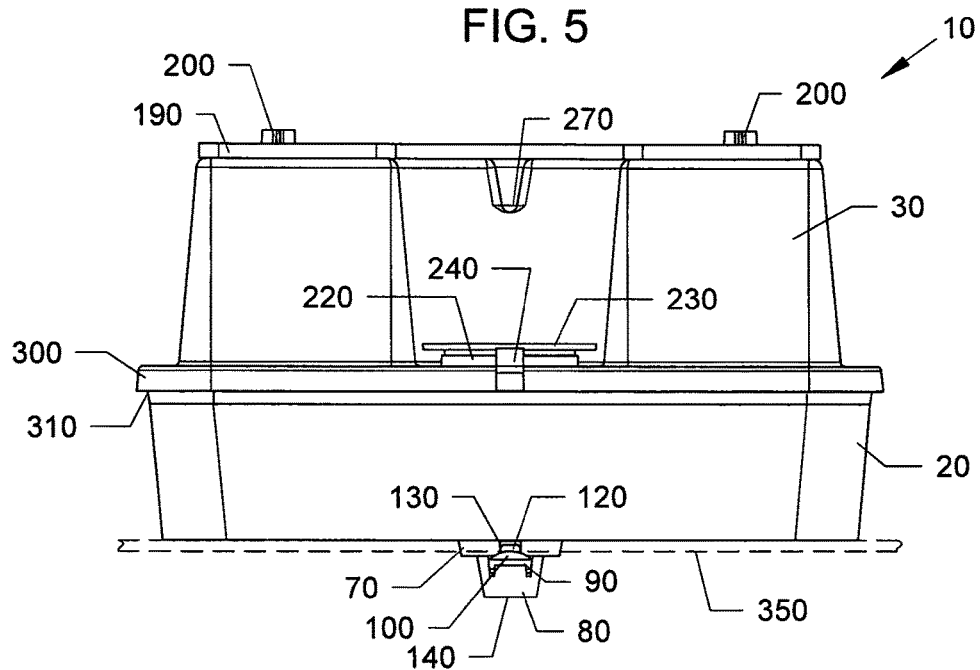
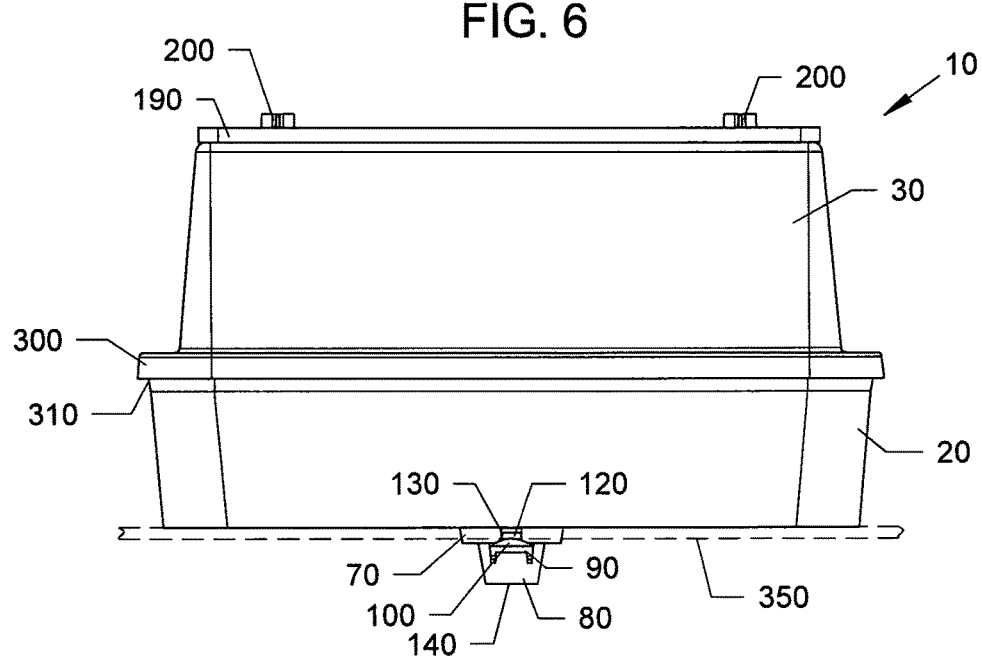

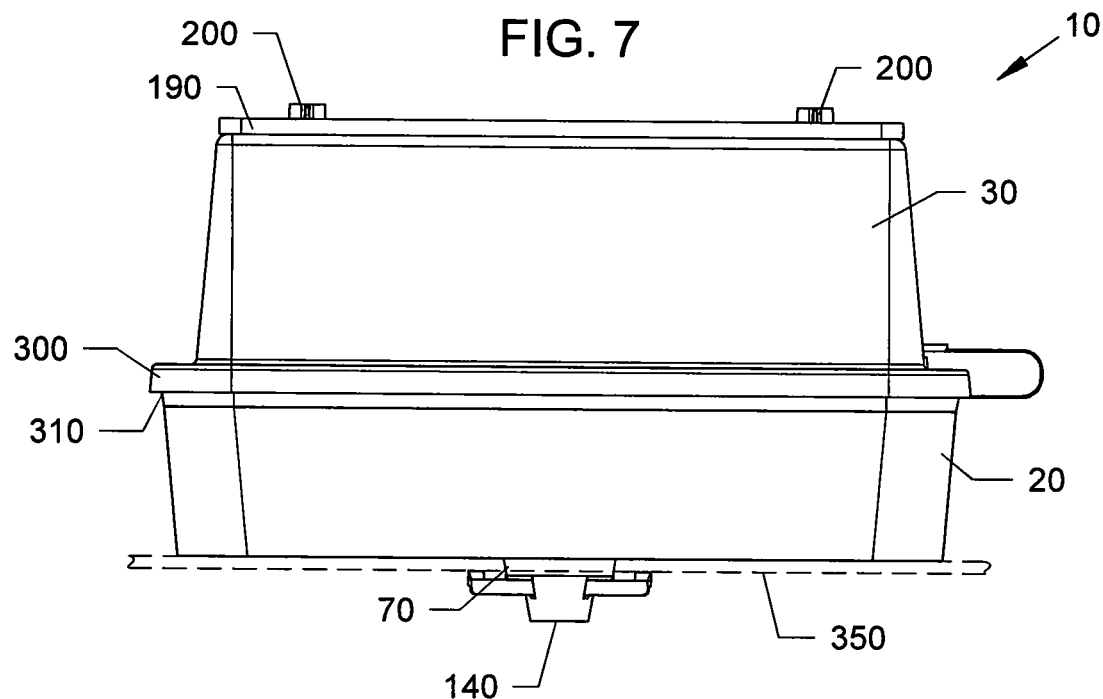
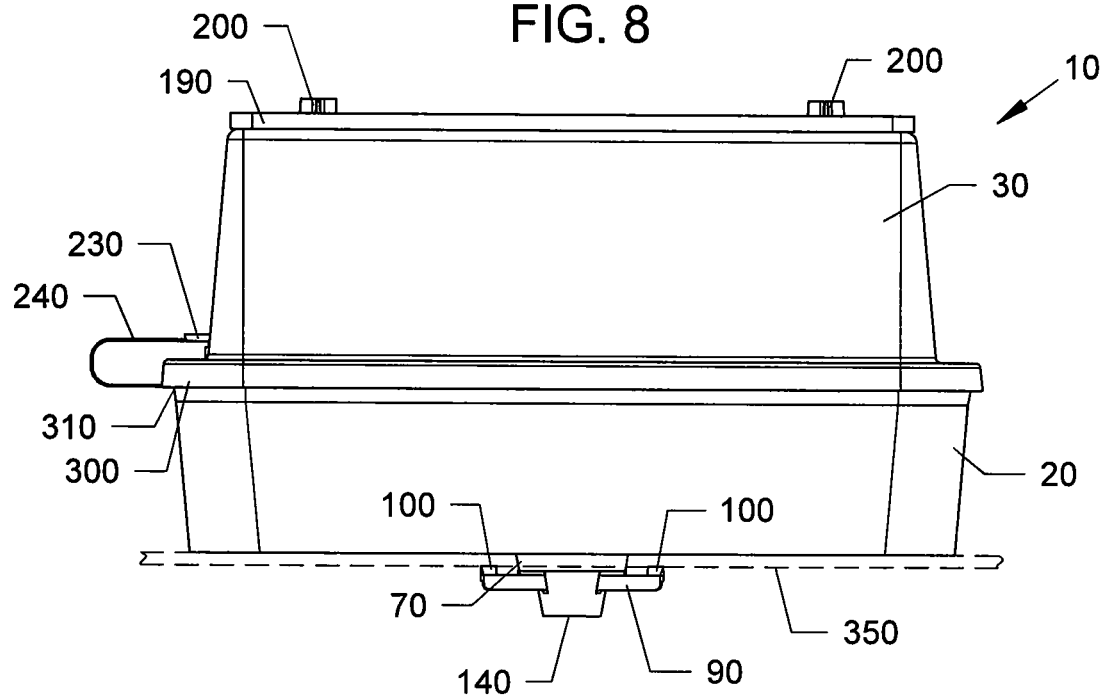

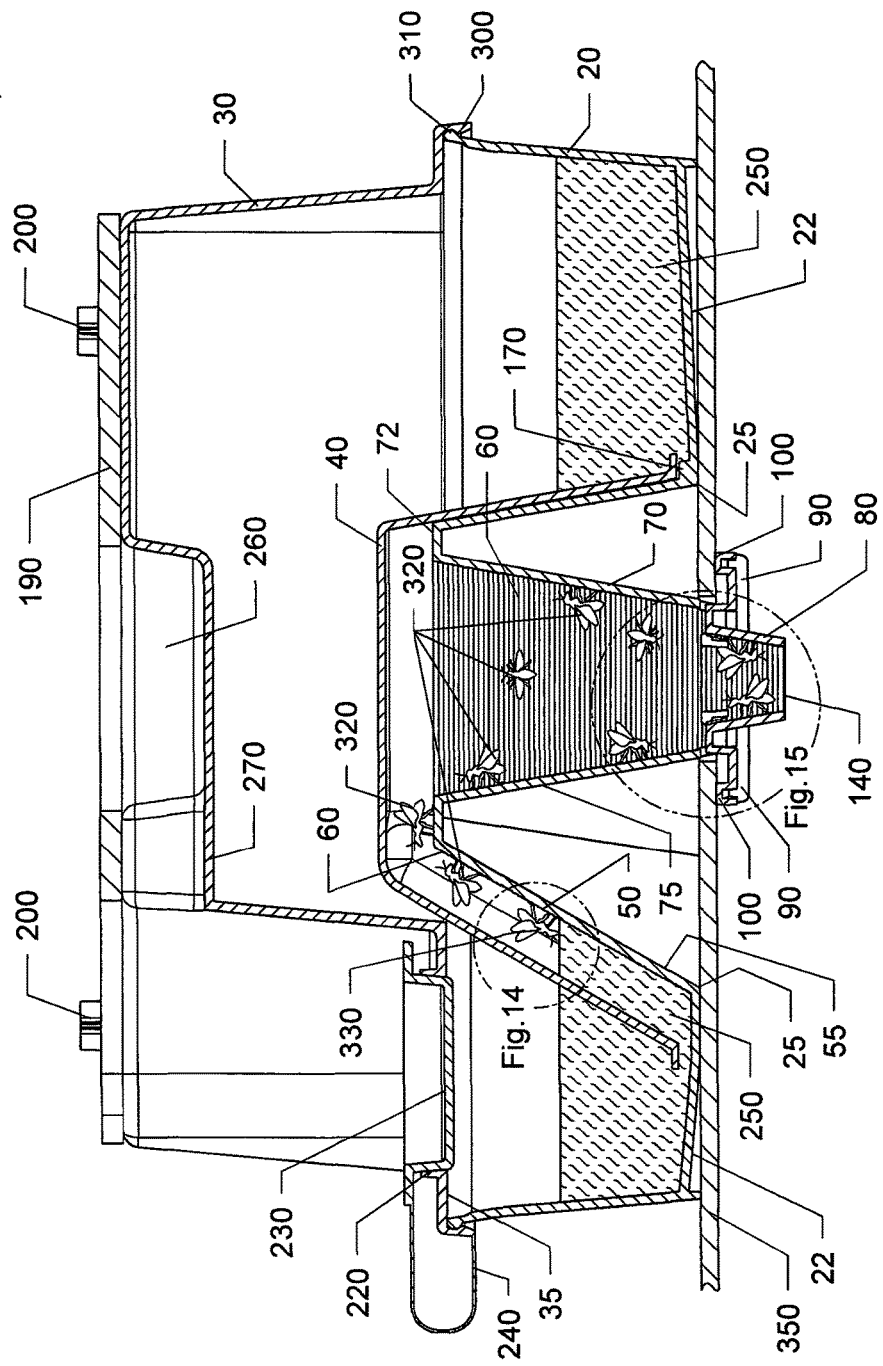

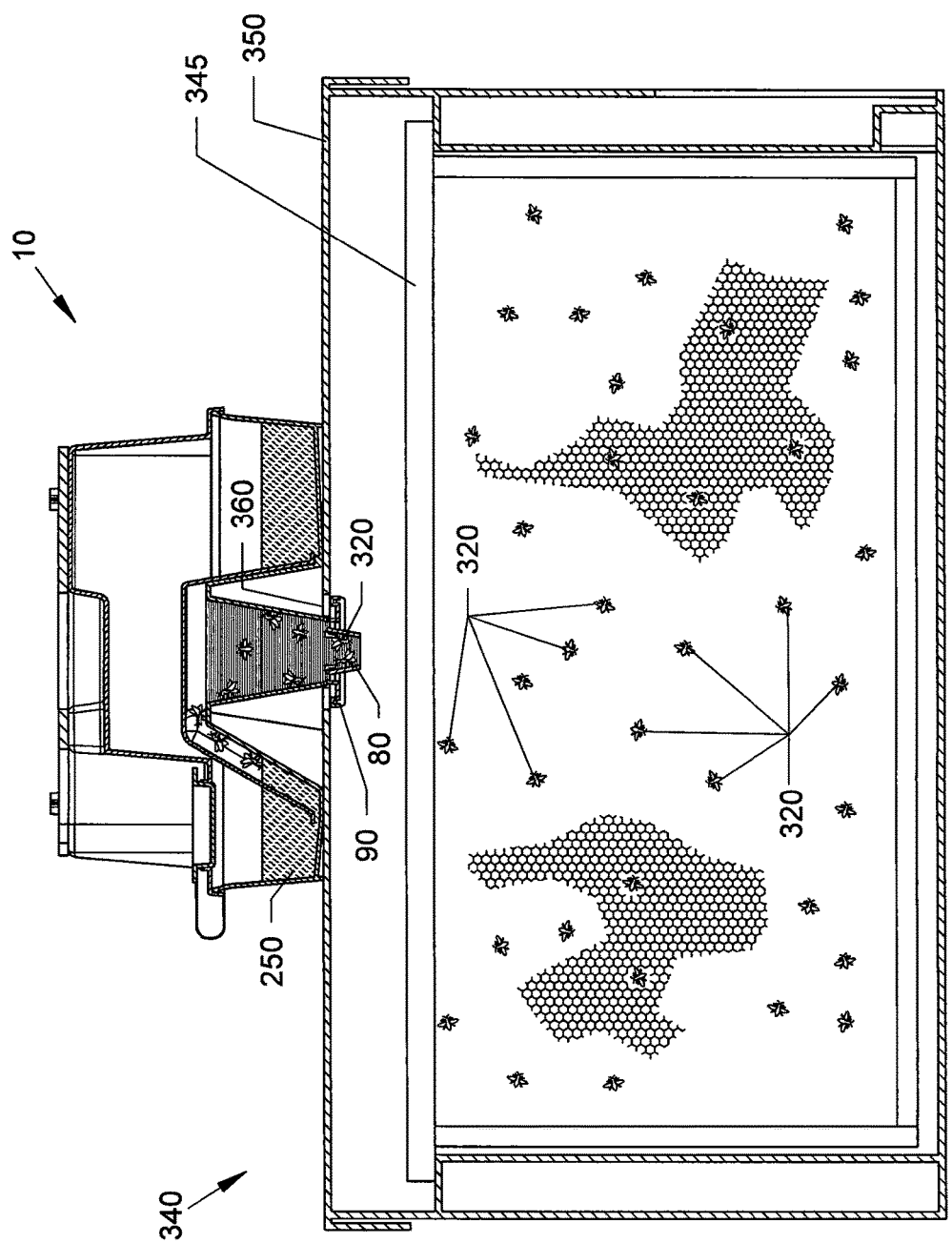

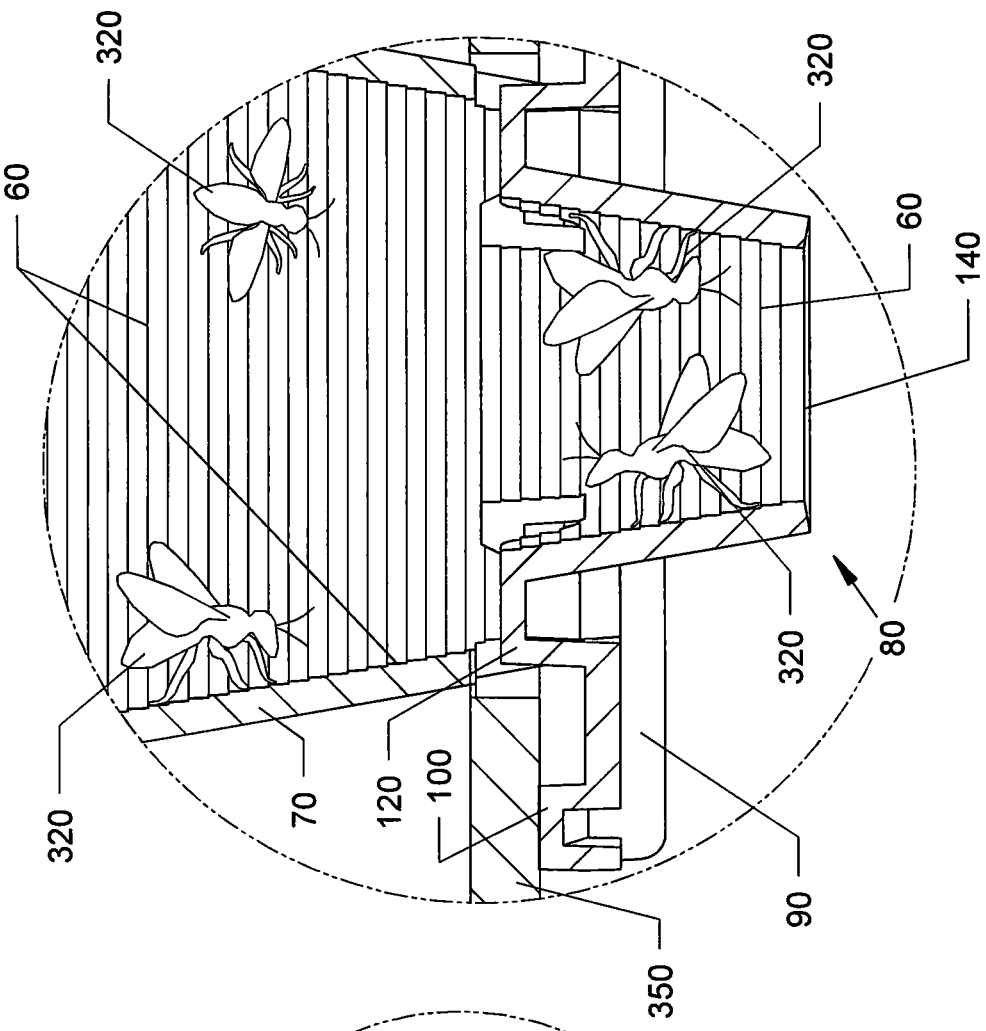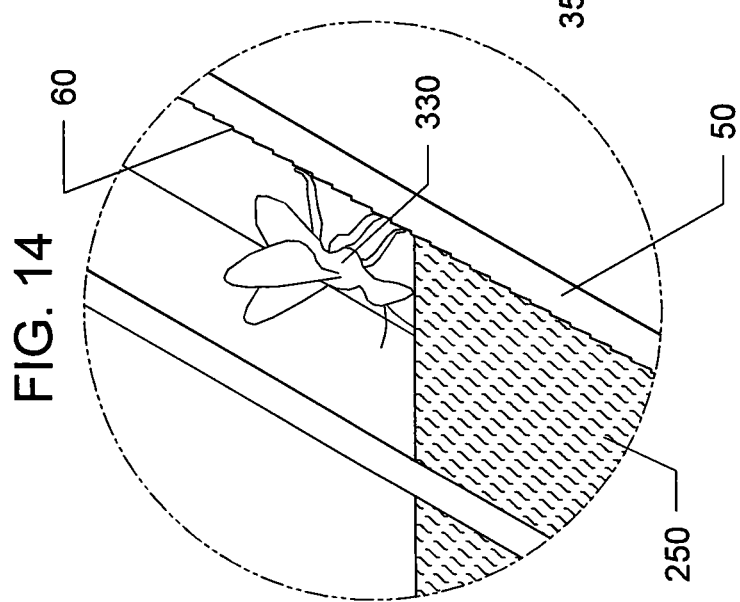

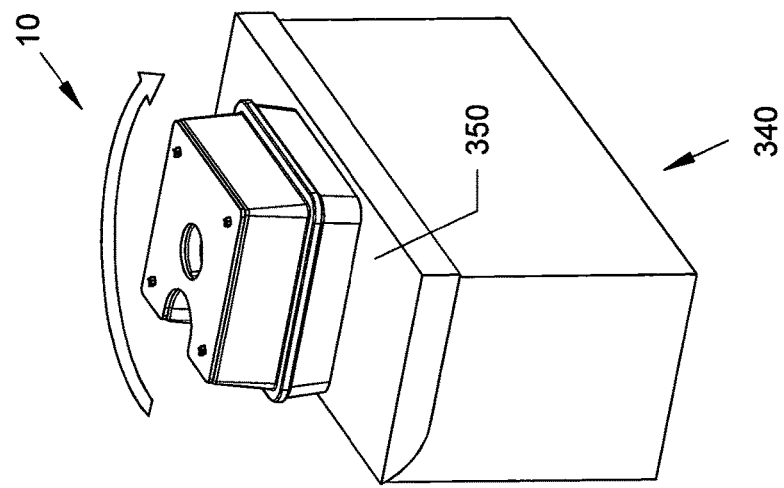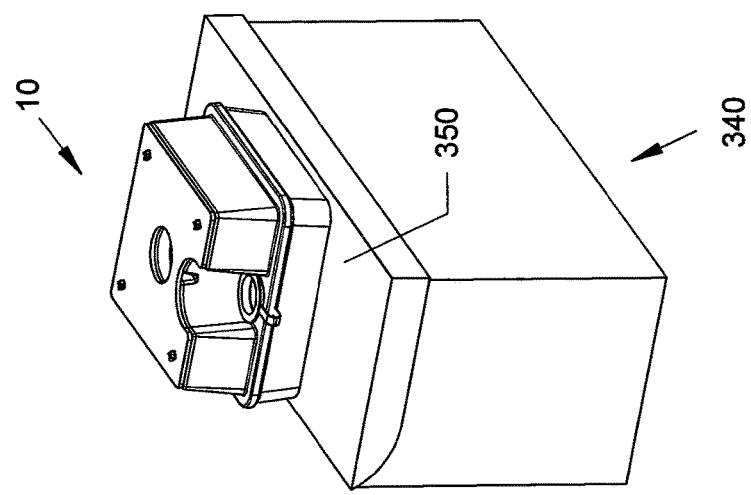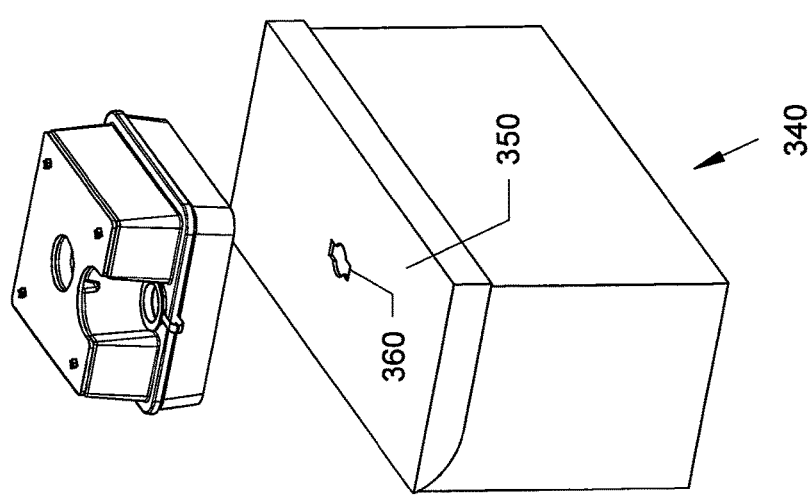

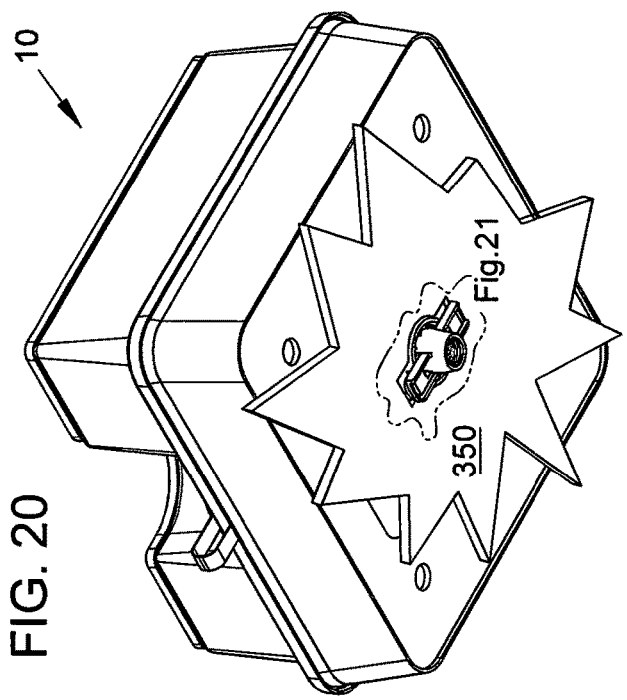
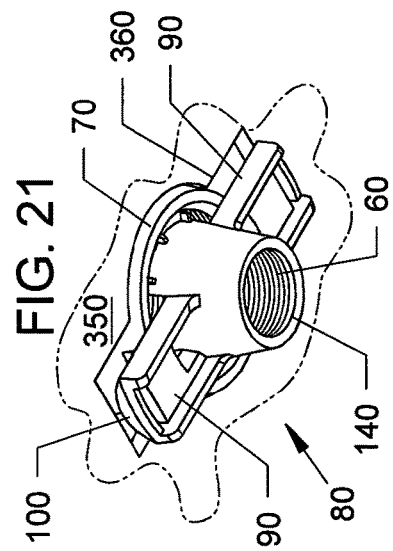
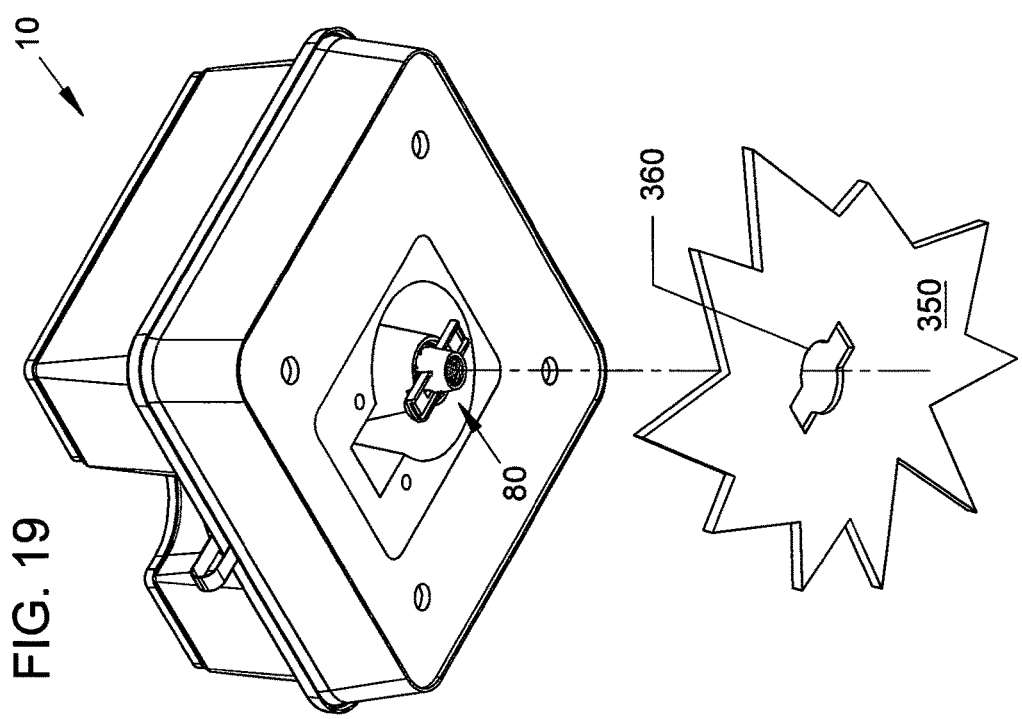

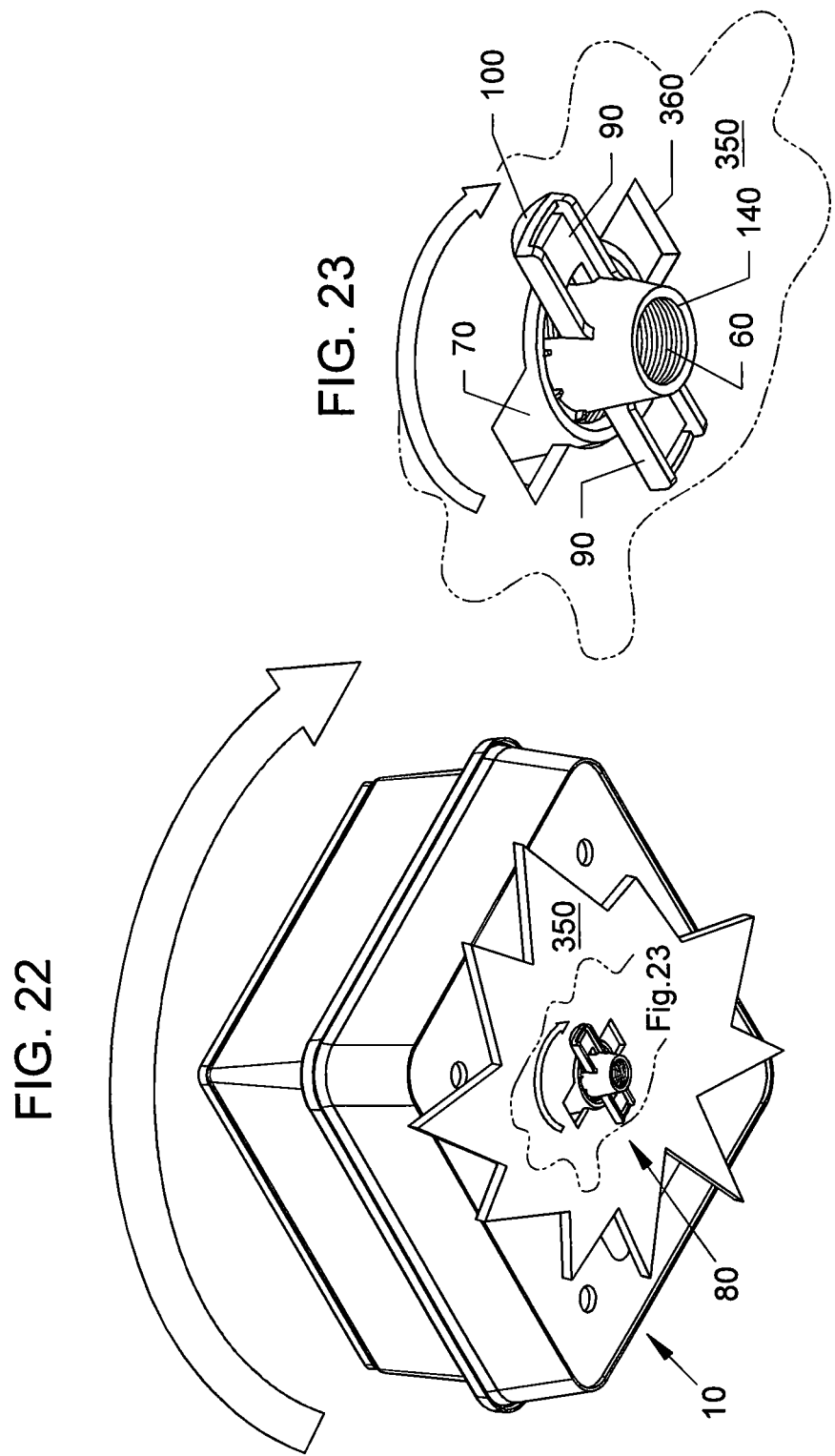

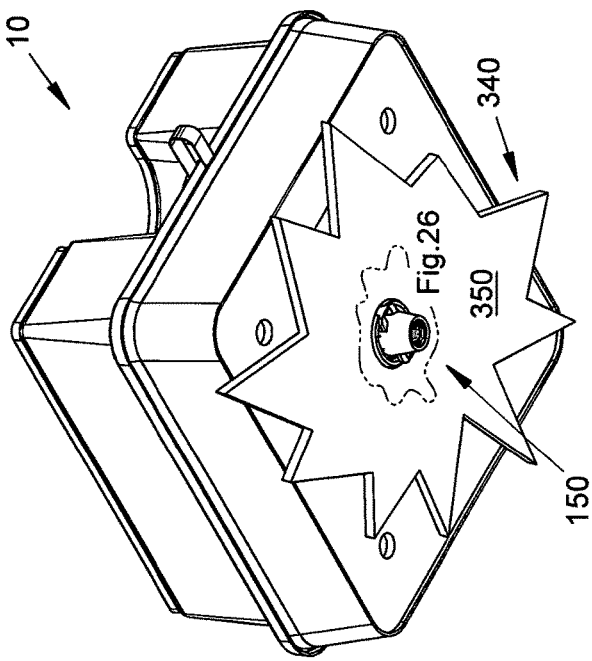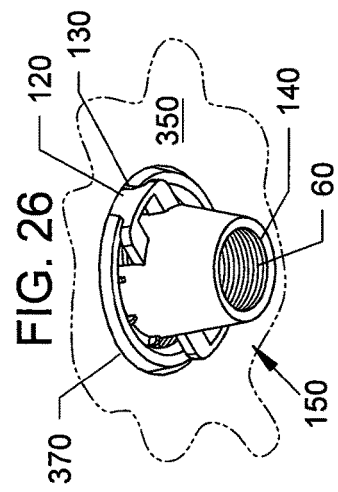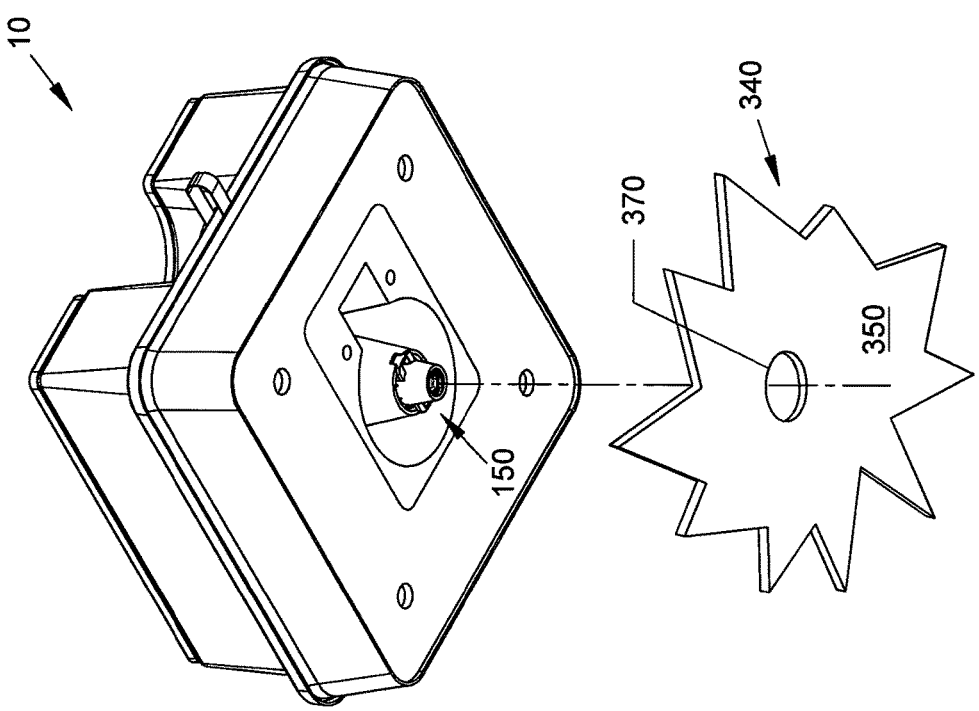

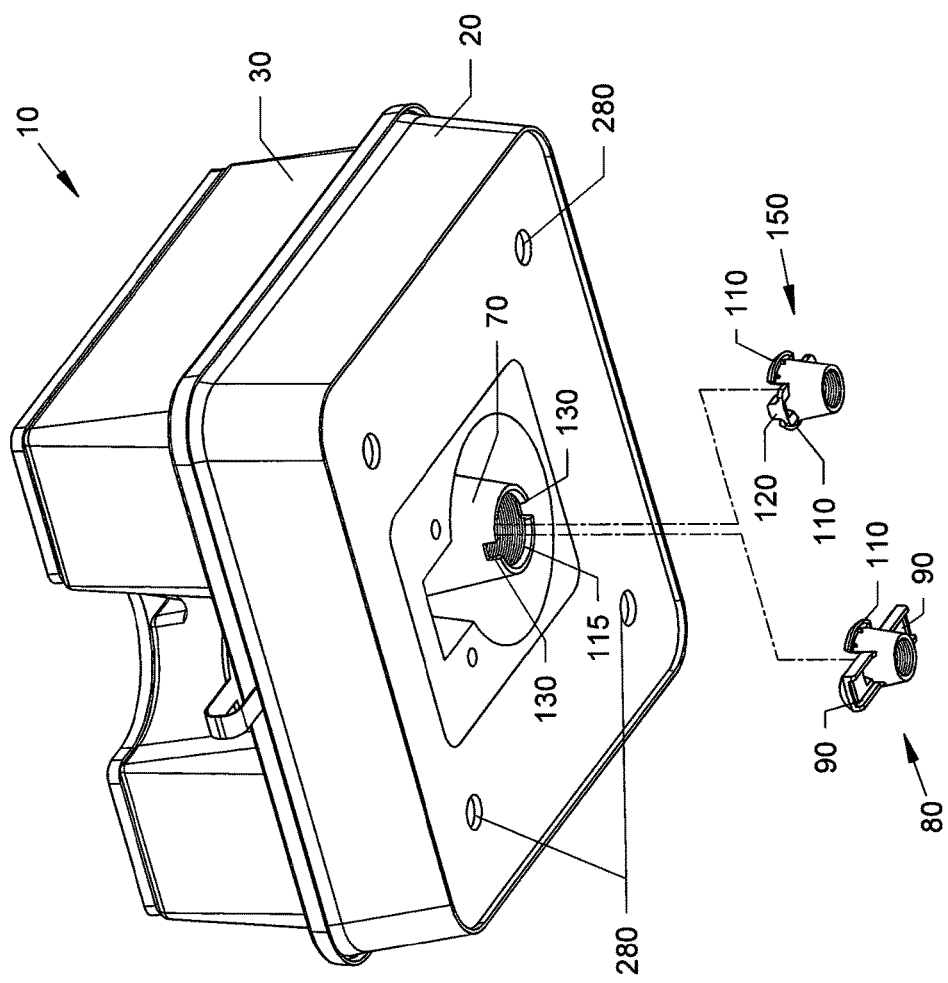

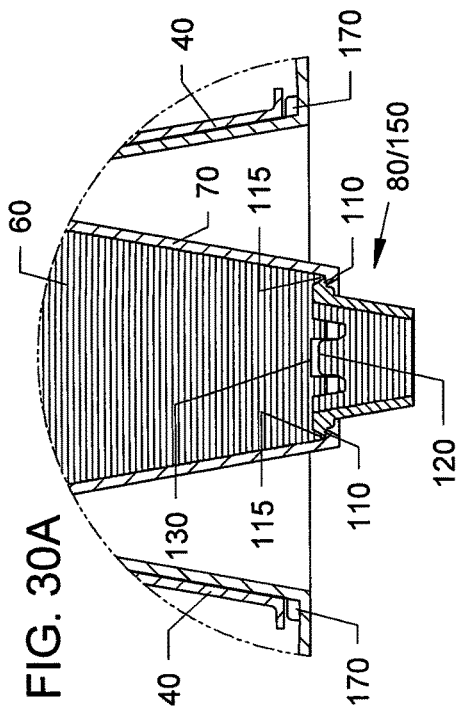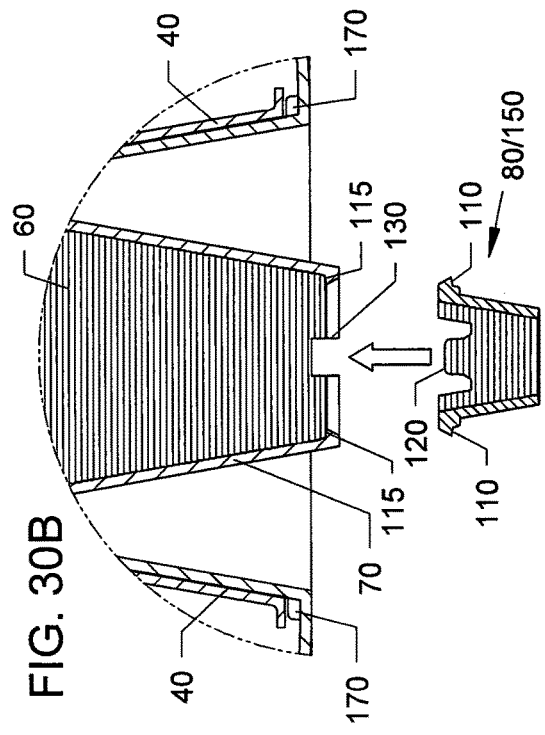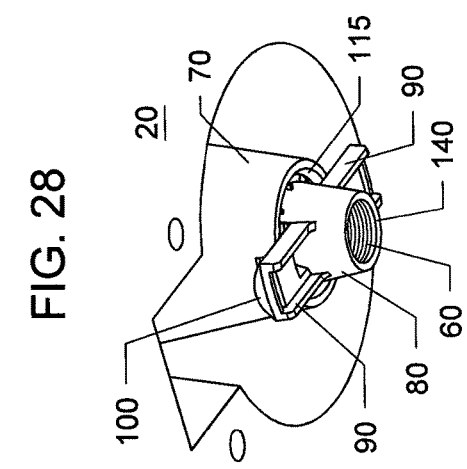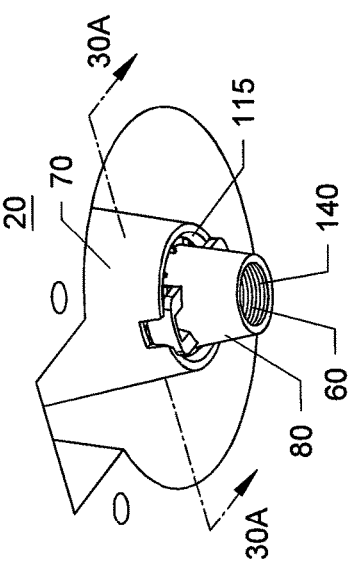

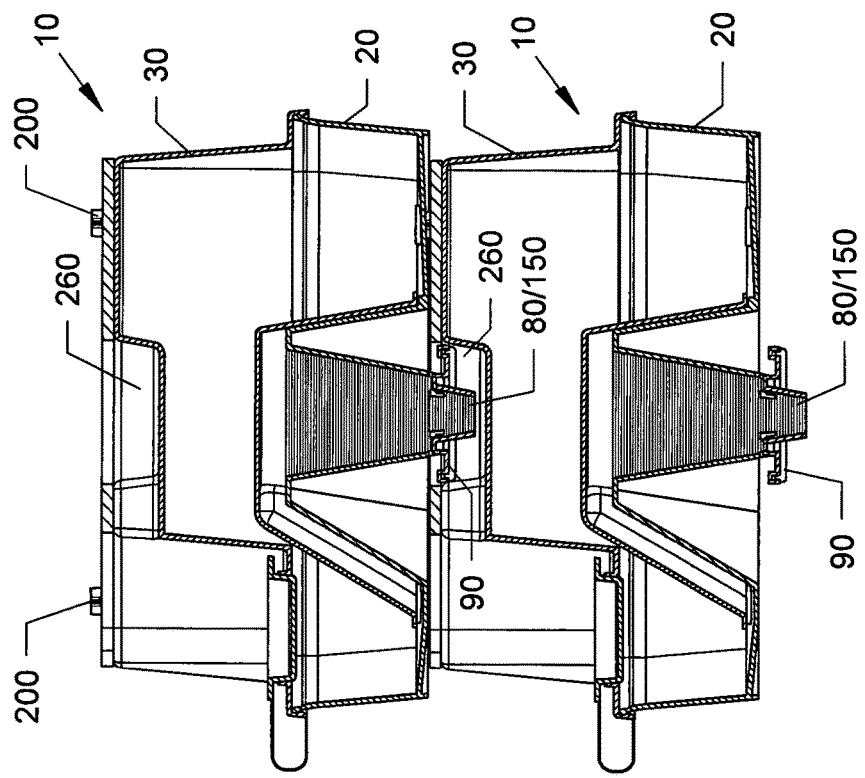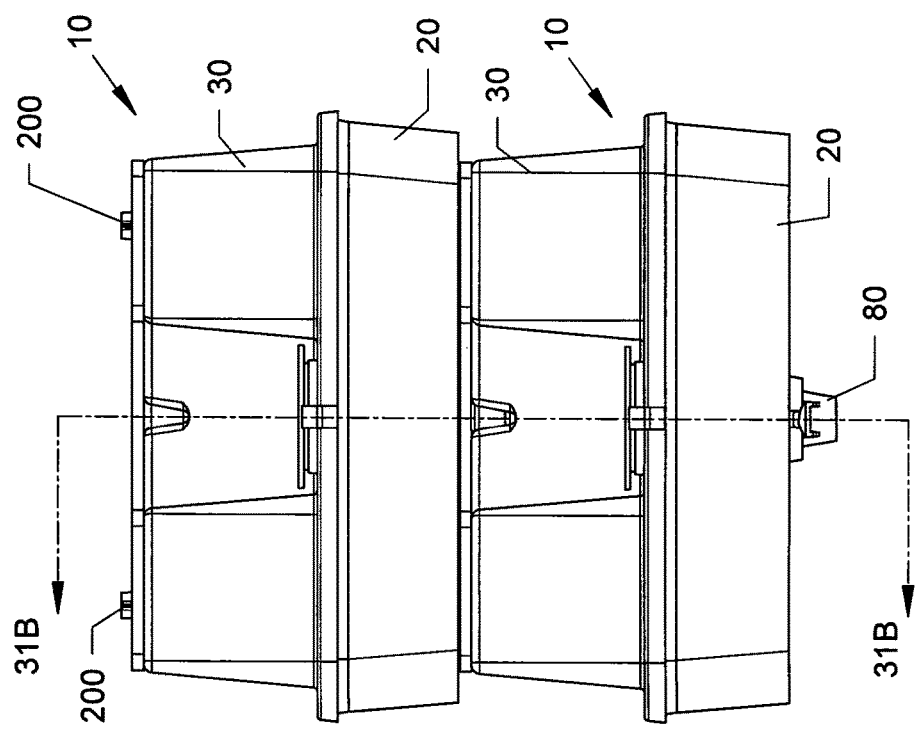

HIVE TOP FEEDER

FIELD OF INVENTION

This invention relates to bees hives, and in particular to systems, devices, and methods for providing a hive top feeder assembly with a feeder housing that can attach to a top of a bee hive, the feeder housing having a downwardly protruding hollow entrance cone with locking arms/wings that can attach within an opening in a hive box, with a hollow feeder cone with angled ladder inside the housing to allow for bees to climb up steps and down steps to reach and consume the syrup from a syrup reservoir in the housing, followed by reversing their path to go down to the hive box.

BACKGROUND AND PRIOR ART

Feeding bees with liquid syrup has been done for many years, but most feeder designs have many problems. For example, the bees can become fouled with pools of open supplies of liquid feed when the liquid feed is being ingested. The sticky feed liquid can stick on the exterior of the bees, which can eventually disable and kill the bees. Also, it is not desirable to let the bees loose to feed on the open supplies of liquid syrup feed supplies.

Opening an existing bee hive, and pouring the liquid syrups into the existing bee hive can be difficult and even dangerous to others around the bee hive.

Using separate feeders has also been tried over the years, from using upside down jars of liquid feed supplies to separate boxes. However, these box feeders have not easily worked over time to control the access of the bees to the liquid supply.

Also, these box feeders are generally not adapted to be physically attached in a secure manner to the bee hives.

Additionally, many box feeders are formed from materials such as wood and cardboard, which renders the box feeders not reusable over time.

Additionally, storing and transporting the prior art box feeders are not able to be easily done since the prior art box feeders are not easily stackable for storage and transportation.

Top feeders have been attempted over the years that have problems. Top feeders have to be removed from the lid of the hive box in order to open up the hive box to allow for access inside of the hive box.

Other types of feeders must be placed inside of a hive box, which takes up space and usually requires another box to store the feeder inside. This arrangement requires both the lid of the box to be removed and the feeder itself to be removed in order to allow for access inside of the hive box.

Thus, the need exists for solutions to the above problems with the prior art.

SUMMARY OF THE INVENTION

A primary objective of the present invention is to provide systems, devices, and methods for providing a hive top feeder assembly with a feeder housing having an internal feeder cone and ladder that can attach to a top of a bee hive box/container, by a downwardly protruding entrance cone with or without locking arms/wings, in order to allow bees to access a liquid feed supply in the hive top feeder.

A secondary objective of the present invention is to provide systems, devices, and methods for providing a hive top feeder assembly with a housing attachable to a bee hive box/container, with the housing having a hollow feeder cone and sloped ladder to allow for bees to climb up steps and down steps on a to reach and consume syrup from a syrup reservoir in the housing, followed by reversing their path to pass back to the hive box/container to later make honey.

A third objective of the present invention is to provide systems, devices, and methods for providing a hive top feeder assembly with a feeder housing having syrup that can attach to a top of a bee hive box/container, where the feeder housing can limit the bees from consuming too much syrup and/or prevents the bees from drowning in the syrup.

A fourth objective of the present invention is to provide systems, devices, and methods for providing a hive top feeder assembly with a feeder housing that can attach to a top of a bee hive box/container, where the feeder housing can be reused over and over again.

A fifth objective of the present invention is to provide systems, devices, and methods for providing a hive top feeder assembly with a feeder housing that can attach to a top of a bee hive box/container, where a plurality of the feeder housings can be easily and securely stacked to one another for easy transportation and storage.

A sixth objective of the present invention is to provide systems, devices, and methods for providing a hive top feeder assembly with a feeder housing that can attach to a top of a bee hive box/container, where the feeder housing can include transparent walls to allow the insides of the housing to be viewed from outside while it is being used in order to monitor the amount of syrup inside.

A seventh objective of the present invention is to provide systems, devices, and methods for providing a hive top feeder assembly with a feeder housing that can attach to a top of a bee hive box/container, where the lid with the attached top feeder can be folded back or removed, so that the inside of the hive box/container can be accessed without having to remove the feeder from the lid.

An eighth objective of the present invention is to provide systems, devices, and methods for providing a hive top feeder assembly with a feeder housing that can attach to a top of a bee hive box/container, with the feeder having a separate shade to keep the hive box/container from getting too hot inside from being placed in the sun.

A ninth objective of the present invention is to provide systems, devices, and methods for providing a hive top feeder assembly with a feeder housing that can attach to a top of a bee hive box/container, having a channel in on top of the feeder which drains water, such as rain away from the feeder housing.

A top feeder assembly for a hive, can include a feeder housing having a separate cover which attaches to a base, a hollow feeder access cone having a narrow diameter lower end adjacent to a central opening through a bottom floor inside of the base, and a wider upper end with interior walls of the hollow feeder access cone having ridges along an interior surface, a separate angled interior wall having an upper end adjacent to the wider upper end of the hollow feeder access cone, and a lower end sloping away from the central opening inside of the base, the separate angled interior wall having raised ridges on an upper surface, a hollow entrance cone connector extending below the housing having an upper end adjacent to the central opening in a bottom of the base, and an opposite narrower width lower end extending away from the bottom of the base, the entrance cone connector having raised ridges along an interior surface, and a liquid syrup inside of the base having a level below the upper end of the first hollow cone, wherein the access cone connector is adapted to be fit on a top of a hive box so that bees can pass in and out of the feeder housing to access the syrup.

The cover and the base can have perimeter edges which mateably snap together to form the housing.

The top feeder assembly can include a barrier cup having a generally closed top, closed sides and an open bottom which is sized to fit over the hollow feeder access cone and the separate angled interior wall and is held in place by the cover of the housing. The barrier cup can include vent holes.

The top feeder assembly can have members to raise the barrier cup over the bottom floor of the base so as to allow the syrup to flow into the cup to achieve a similar level of syrup. The members can include standoff ribs between a bottom edge of the cup and the bottom floor of the base.

The cover can include a generally central located cavity in the cover sized to fit the hollow entrance cone connector, so that an identical housing of the top feeder assembly are stackable to one another with the hollow entrance cone connector of the identical housing is insertable within the cavity in the cover of the housing of the feeder assembly.

The generally central located cavity can include a drain channel in the cavity which allows water to drain away from the feeder assembly.

The top feeder assembly can include a removable plug insertable into a fill hole in the cover for allowing the syrup to be poured into the housing.

The removable plug can include a strap for securing the plug to the housing when the plug is removed from the fill hole in the cover.

The top feeder assembly can include a lower ledge surface in the cover below the drain channel, the lower ledge surface having the fill opening therein.

The top feeder assembly can include notches along the lower end of the feeder access cone in the base, and upper clip edges on the upper end of the hollow entrance cone connector for connecting to the notches on the lower end of the feeder access cone.

The top feeder assembly can include outwardly extending locking wings which extend sideways from the hollow entrance cone connector below the upper clip edges.

The top feeder assembly can include a hive box with a lid for mounting the top feeder assembly housing onto a mateable opening in the lid of the hive box, the mateable opening having a generally cylindrical shape with side extending notches sized to receive the locking wings extending sideways from the hollow access cone connector, wherein the lower end of the hollow access cone connector with the locking wings being insertable into the mateable opening in the lid of the hive box, and followed by rotating the hive box locks the hive box to the housing of the top feeder assembly.

The base can include a keyhole shaped opening in a lower facing surface of the bottom floor of the base, with a closed cavity formed by interior facing surfaces of the hollow feeder access cone an interior facing surface of the separate angled interior wall.

The top feeder assembly can further include a separate shade panel attachable and detachable to the cover of the housing for providing shade to the housing when the housing is exposed to sunlight.

The top feeder assembly can include openings and bosses which mateably attach to one another for allowing the shade panel to be attached to the cover of the housing.

The bottom surface of the base can include closed indentations sized to receive the bosses extending upward from another cover with another base of another feeder housing so that another housing is stackable with the base and the cover of the feeder assembly.

The cover can have a reflective color to prevent overheating inside of the housing when exposed to the sun, and the base can have transparent walls in order to monitor the syrup level inside.

Another top feeder assembly for a hive, can comprise in combination a feeder housing having a separate cover which attaches to a base, and ramps inside of the base which lead to a syrup reservoir, wherein the ramps are adapted to limit access of traveling bees from consuming too much syrup and from being drowned in the syrup, and a hollow connector cone attached to and extending below the base, the hollow connector cone having outwardly extending wings located below the base, and a hive box having a folding lid thereon, the lid having a keyhole opening for allowing the connector cone extending below the base to be inserted therein, and rotating the hive box locks the hive box to the feeder housing, wherein bees from the hive box pass into the hollow connector cone and inside the feeder housing, and wherein the feeder housing remains attached to the lid, when the lid is folded back from the hive box.

Further objects and advantages of this invention will be apparent from the following detailed description of the presently preferred embodiments which are illustrated schematically in the accompanying drawings.

BRIEF DESCRIPTION OF THE FIGURES

FIG. 1 is a top front perspective view of the novel feeder assembly.

FIG. 2 is a top rear perspective view of the feeder assembly of FIG. 1.

FIG. 3 is a bottom rear perspective view of the feeder assembly of FIG. 1.

FIG. 4 is a bottom front perspective view of the feeder assembly of FIG. 1.

FIG. 5 is a front view of the feeder assembly of FIG. 1.

FIG. 6 is a rear view of the feeder assembly of FIG. 1.

FIG. 7 is a left side view of the feeder assembly of FIG. 1.

FIG. 8 is a right side view of the feeder assembly of FIG. 1.

FIG. 13A is a side cross-sectional view of the feeder assembly of FIG. 10 along arrows 13.

FIG. 13B is a side-sectional view of the feeder assembly of FIG. 13A attached to the top of a bee hive box/container with bees traveling between the assembly and the hive box/container.

FIG. 14 is an enlarged view of a bee climbing down the syrup access ladder to reach the syrup reservoir shown in FIG. 13B.

FIG. 15 is an enlarged view of bees traveling up and down the access opening and feeder access cone shown in FIG. 13B.

FIG. 16 is a front top perspective of the feeder assembly of the preceding figures in position to attach to a hive box/container.

FIG. 17 is another view of the feeder assembly sitting on top of, but not locked to the hive box/container of FIG. 16.

FIG. 18 is another view of the feeder assembly on the hive box/container of FIG. 17 with the feeder assembly rotating 90 degrees to lock it onto the hive box/container. The feeder assembly can be rotated clockwise or counter-clockwise to lock it onto the hive box/container.

FIG. 19 is a bottom perspective view of the feeder assembly of FIG. 16 showing locking arm detail and key-way hole detail in the top lid of the hive box/container.

FIG. 20 is a bottom perspective view of FIG. 17 showing locking entrance cone of the feeder assembly protruding through the key-way hole in the lid of the hive box/container and into the hive box/container, with the feeder assembly not locked to the lid of the hive box/container.

FIG. 21 is an enlarged view of the locking snap-in entrance cone of FIG. 21.

FIG. 22 is a bottom perspective view of feeder assembly of FIG. 18 showing the locking arms of the entrance cone rotated and contacting the inside surface of the lid of the hive box/container. This locks the feeder assembly to the lid of the hive box/container.

FIG. 23 is an enlarged view of the locked snap-in entrance cone of FIG. 22.

FIG. 24 is a bottom perspective view of feeder assembly of the preceding figures with non-locking entrance cone embodiment in position to place on top of a hive box/container with only a round hole in the lid and not a key-way hole. This feeder assembly will not lock to the hive box/container. This feature allows the feeder to be used with more types of hives and different types of hive/box containers.

FIG. 25 is another view of the feeder assembly of FIG. 24 showing the feeder assembly engaged to the hive box/container with the entrance cone protruding through the hive lid and into the hive box/container.

FIG. 26 is an enlarged view of the entrance cone on the feeder assembly of FIG. 25.

FIG. 27 is a bottom perspective of the feeder assembly of the preceding figures showing the two alternate entrance cone embodiments.

FIG. 28 is an enlarged view of the locking entrance cone of FIG. 27 assembled into the feeder access cone of the feeder assembly.

FIG. 29 is an enlarged view of the non-locking entrance cone of FIG. 27 assembled into the feeder access cone of the feeder assembly.

FIG. 30A is a cross-sectional view of the entrance cone attached to the access cone of FIG. 29 along arrows 30A.

FIG. 30B is another cross-sectional view of the entrance cone detached from the access cone of FIG. 30A.

FIG. 31A is a side view of stacked feeder assemblies of the preceding figures.

FIG. 31B is a cross-sectional view of the stacked feeder assemblies of FIG. 31A along arrow 31B.

DESCRIPTION OF THE PREFERRED EMBODIMENTS

Figure 9:
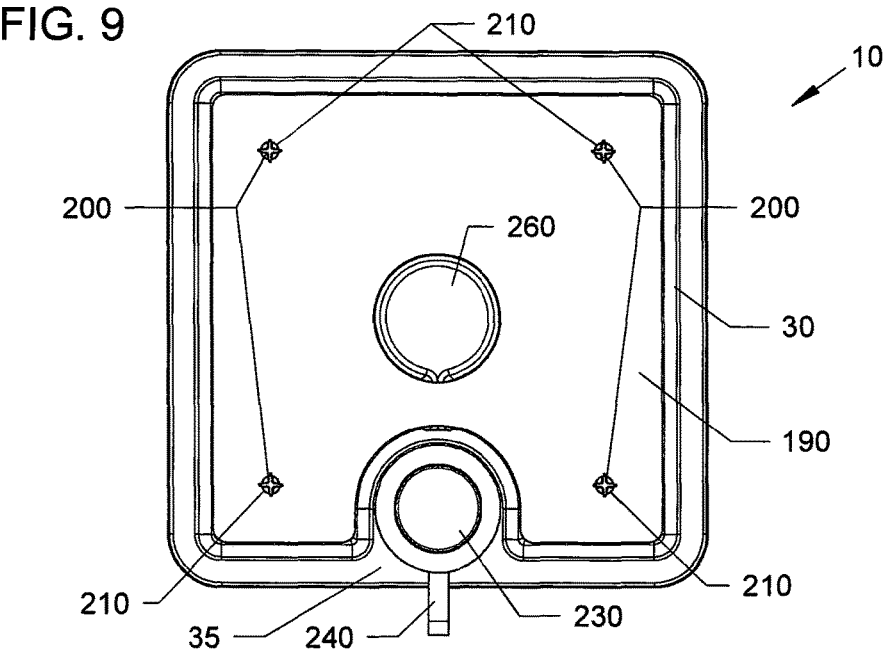
FIG. 9 is a top view of the feeder assembly of FIG. 1.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
- 10 feeder assembly.
- 20 Feeder base
- 22 bottom surface.
- 25 keyhole shaped opening 25 in bottom of base 20
- 30 Feeder snap-on cover.
- 35 lower ledge
- 40 Syrup barrier cup.
- 42 outwardly expanding side wall 42
- 45 barrier cup vent holes
- 50 Syrup access ladder (separate angled interior wall)
- 55 inside facing wall to cavity above key hole opening 25
- 60 Micro-steps for bee climbing stability.
- 70 Feeder access cone.
- 72 rim on top of upper end of cone 70
- 75 inside facing wall to cavity above key hole opening 25
- 80 Locking snap-in entrance cone connector.
- 90 Entrance cone locking arms/wings.
- 100 Locking arm cam.
- 110 Entrance locking ramp locks entrance cone into access cone of feeder base.
- 115 Feeder access cone locking ramp engages entrance locking ramps of entrance cone to lock entrance cone into feeder access cone.
- 120 Entrance cone locating boss.
- 130 Access cone locating notches engage the locating bosses on the entrance cone.
- 140 Entrance cone access opening.
- 150 Non-locking snap-in entrance cone.
- 160 Barrier cup holding pegs secure the cup into the bottom of the base.
- 170 Barrier cup standoff ribs hold the cup slightly off the bottom of the base to allow syrup to flow into the cup and achieve the same level of the syrup supply outside the cup.
- 190 Shade panel affixes to top of cover via holes in the shade and bosses on the cover.
- 200 Shade panel mounting bosses.
- 210 Shade panel mounting holes.
- 220 Syrup fill port/opening in cover.
- 230 Fill port plug.
- 240 Fill port strap secures plug to cover when plug is on in fill port hole.
- 250 Feeding syrup/syrup reservoir
- 260 Stacking cavity in cover provides clearance for entrance cone when assemblies are stacked.

270 Drain channel for stacking cavity prevents water accumulation.

280 closed indentations are stacking cavities in base bottom align with shade mount bosses on cover.

290 Entrance cone locking ramp inside of access cone.

300 Cover snap closure comprising downward bent lip edge along lower ends of cover sidewalls 310 Base snap closure comprising outwardly extending ridge along upper sidewall perimeter of the base 320 Climbing bee.

330 Feeding bee.

340 hive box/container 350 hive lid to box/container

360 Feeder access keyway hole in lid for locking feeder assembly.

370 Feeder access hole in lid for non-locking feeder assembly.

Figure 10:
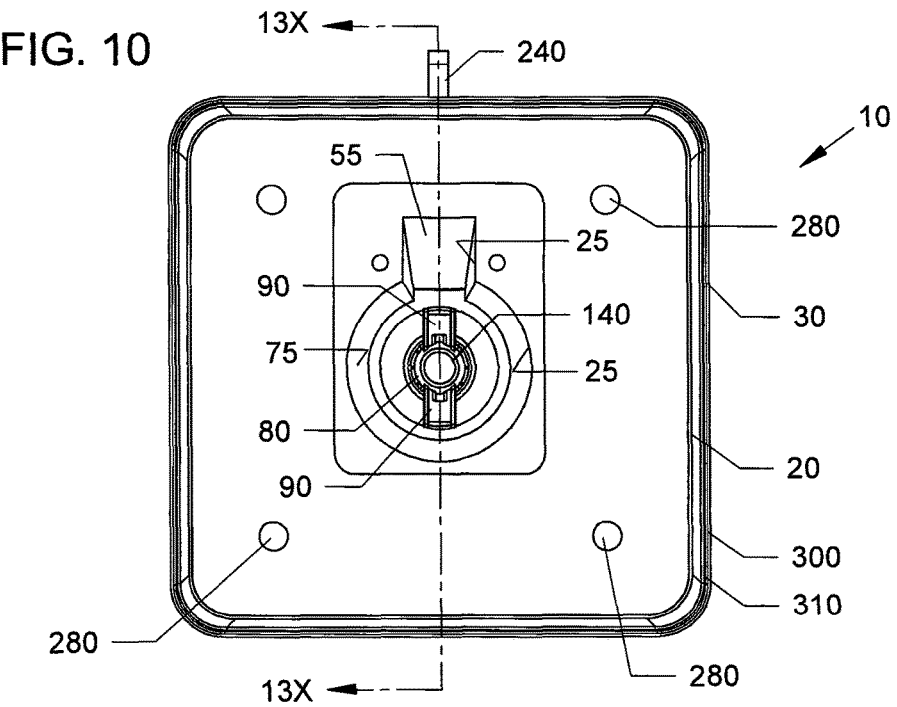
FIG. 10 is a bottom view of the feeder assembly of FIG. 1.

FIG. 1 is a top front perspective view of the novel feeder assembly 10. FIG. 2 is a top rear perspective view of the feeder assembly 10 of FIG. 1. FIG. 3 is a bottom rear perspective view of the feeder assembly 10 of FIG. 1. FIG. 4 is a bottom front perspective view of the feeder assembly 10 of FIG. 1. FIG. 5 is a front view of the feeder assembly 10 of FIG. 1. FIG. 6 is a rear view of the feeder assembly 10 of FIG. 1. FIG. 7 is a left side view of the feeder assembly 10 of FIG. 1. FIG. 8 is a right side view of the feeder assembly 10 of FIG. 1. FIG. 9 is a top view of the feeder assembly 10 of FIG. 1. FIG. 10 is a bottom view of the feeder assembly 10 of FIG. 1.

Figure 11:
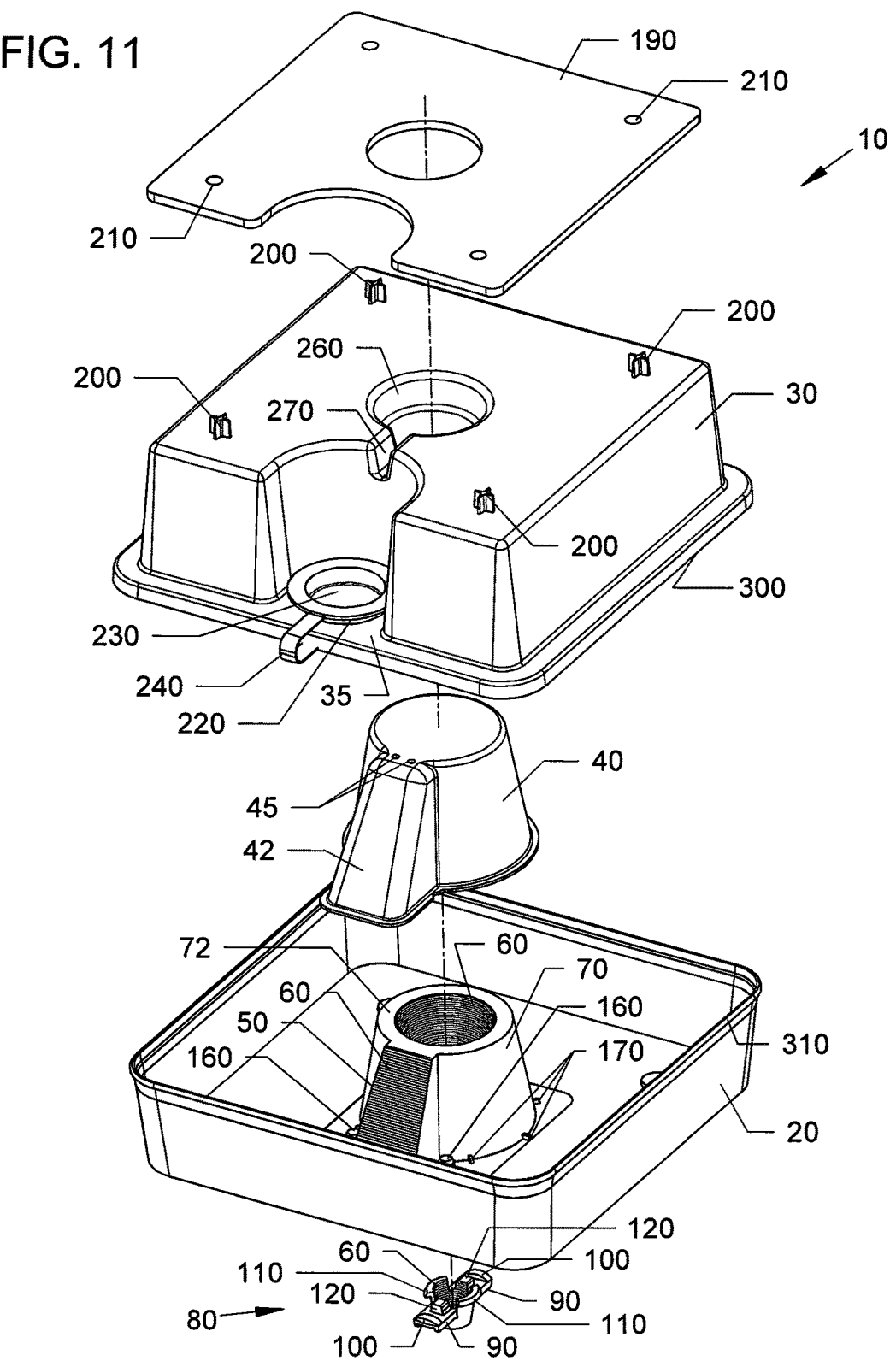
FIG. 11 is a front top exploded view of the feeder assembly of FIG. 1.
Figure 12:
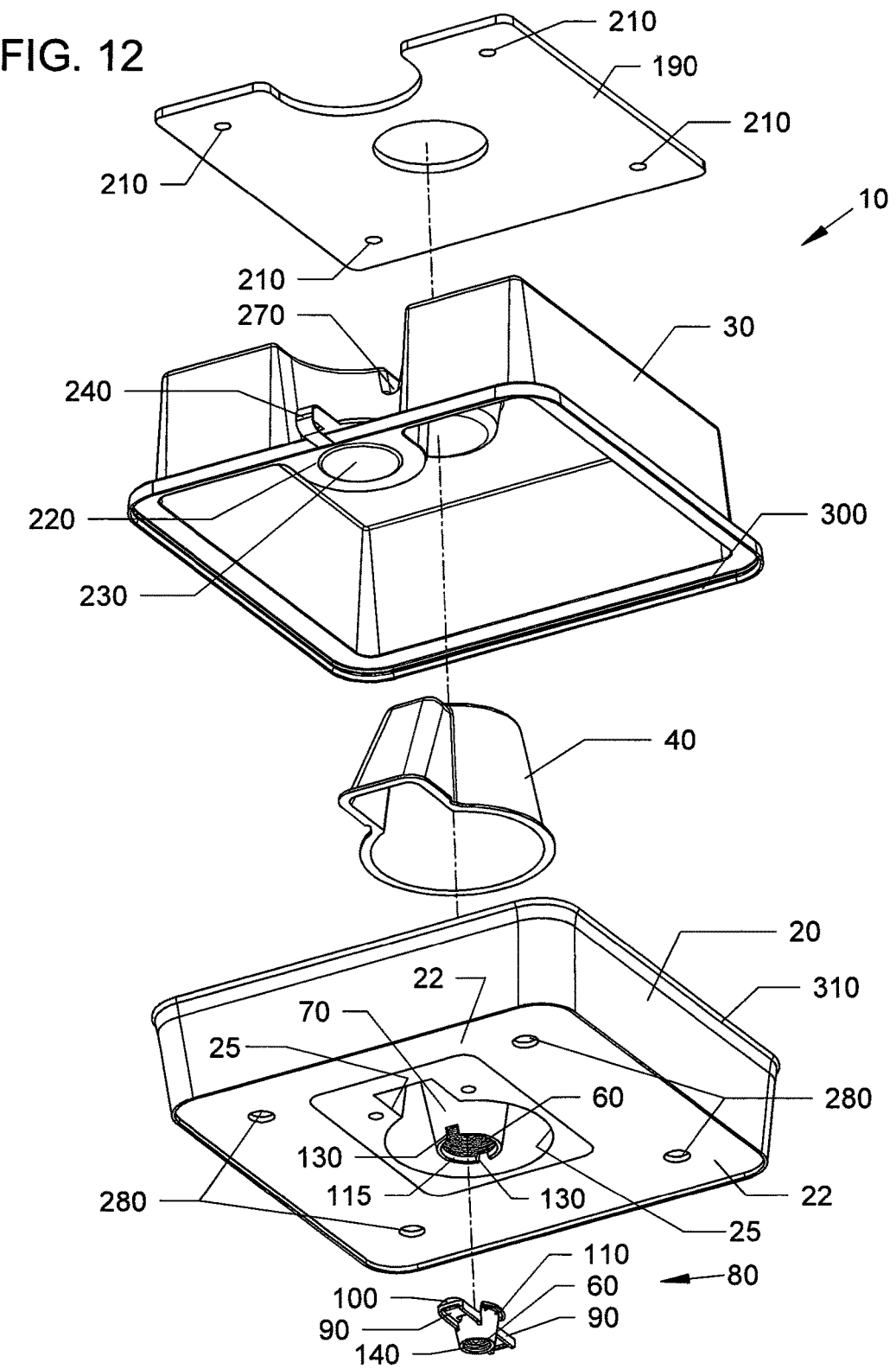
FIG. 12 is a front bottom exploded view of the feeder assembly of FIG. 11.

FIG. 11 is a front top exploded view of the feeder assembly 10 of FIG. 1. FIG. 12 is a front bottom exploded view of the feeder assembly 10 of FIG. 11.

FIG. 13A is a side cross-sectional view of the feeder assembly 10 of FIG. 10 along arrows 13.

Referring to FIGS. 1-13A, the feeder assembly 10 can include a housing having a base 20 with a cover 30. Extending outward from lower ends of sidewalls of the cover 30 can be downward bent lip edge 300 which snaps to an upper outwardly extending perimeter edge 310 on top of the side walls of the base 20.

The cover 30 can include a top having a cavity 260 with a bottom surface, the cavity 260 of which can receive a feeder access cone 70 which will be described later. Inside the cavity 260 along the bottom surface can be a drainage channel 270 which can allow syrup or fluid coming out of an upper stacked identical feeder housing to drain therefrom. The drainage channel 270 can pass to a lower ledge 35 on the outside of the cover 30. Channel 270 can drain rainwater from pooling inside of the cavity 260 of the cover 20.

A syrup port/opening 220 in the ledge 35 can allow for syrup 250 to be poured into the housing while the housing cover 30 is attached to the housing base 20. A plug 230 can close off the port/opening 220. The plug 230 can include a strap 240 for continuously securing the plug 230 to the cover 30 when the plug 230 has been removed from the port/opening 220.

A separate shade panel 190 sized to completely cover the top surface of the cover 30 can have a plurality of mounting holes 210 for being attachable to mounting bosses 200 that extend upward from the cover 30. The bosses 200 can be flexible/pliable members that can bend inward while the holes 210 are pushed over the bosses 200, so as to form a friction fit to lock the shade panel 190 to the cover 30. The shade panel 190 allows for creating a separate material to keep the feeder housing of the feeder assembly 10 from being exposed to sunlight and prevent overheating inside of the feeder assembly 10. The bosses 200 can allow for the shade panel 190 to be remain sandwiched to the top of the cover 30.

Alternatively, the bosses 200 also allow for the shade panel 190 to be remain spaced above the cover 30 when being used. The separate shade panel 190 can be UV (ultra violet) treated material which helps reduce and prevent the cover 30 and base 20 of the feeder assembly 10 from heating up when being used in the sunlight. While the fasteners show bosses 200 and openings 210, other types of fasteners, can be used.

The shade panel 190 can be formed from material such as but not limited to corrugated plastic, foam board (open or closed cell), other plastic materials, and other materials, such as but not limited to wood, and the like.

Referring to FIGS. 3-13A, the base 20 can have a closed bottom surface 22 with a plurality of closed indentations 280 closed indentations which form stacking cavities in the base bottom surface 22 which align with the shade mount bosses 200 on the cover 30 so as to help stack a plurality of the housings on top of one another. Located generally central along the bottom surface 22 can be a generally key hole shaped opening 25 with a closed cavity formed from inside facing walls 55, 75 of the ladder 50 and feeder access cone 70.

The feeder access 70 can have a generally cone shape with a lower end having a narrower diameter opening than the upper end opening. Along the inside walls of the cone connector 80 can be raised ridges or indentations 60 that form micro-steps that allow for bees to climb up and down. The micro-steps 60 can be parallel rings that run along the inner walls between the lower inside end up to the upper inside end of the feeder access cone 70. The side wall inside the cone 70 can be generally sloped so as to form a ramp walking surface for the bees.

On top of the upper end of the feeder access cone 70 can be a rim 72 that leads a separate angled interior wall 50 which has a lower end forming into the bottom interior floor of the base 20. The upper exposed surface of the separate angled interior wall 50 can also include micro-steps 60 thereon, and function as a syrup access ladder for the bees. The ladder 50 can function as a ramp walking surface for the bees.

A syrup barrier cup 40 having an upper end with a closed top and generally outwardly expanding cone shaped side walls, with a single outwardly expanding side wall 42, and an open bottom. The cup can fit over the open upper end of feeder access cone 70 and separate angled interior wall 50 and prevent the traveling bees from exiting out of the base 20 of the housing when the cover 30 is removed.

Barrier cup holding pegs 160 can be used to secure the cup 40 into the bottom floor 22 of the base 20. Barrier cup standoff ribs 170 can be used to hold the cup 40 slightly off the bottom floor 22 of the base 20 to allow syrup 250 to flow into the cup 40 and achieve the same level of the syrup 250 supply outside the cup 40. Barrier cup vent holes 45 can be used to prevent vapor lock which would not allow the syrup level inside the barrier cup 40 to match the syrup level outside the cup 40.

The channel 270 in the cover 30 can angle down to a lower ledge 35. The underside of the cover 30 can have a channel 270 and/or ledge 35 which can rest on top of the cup 40 which can hold the cup 40 in place, and not separate when the feeder assembly 10 is being lifted up, turned and/or moved.

FIG. 13B is a side-sectional view of the feeder assembly 10 of FIG. 13A attached to the top of a bee hive box/ container 340 with bees 320 climbing and traveling between the assembly 10 and hive box/container 340.

FIG. 14 is an enlarged view of a bee 330 climbing down the micro-steps 60 on the syrup access ladder 50 to reach the syrup reservoir 250 which is shown in FIG. 13B.

FIG. 15 is an enlarged view of bees 320 traveling up and down the access opening in the access cone connector 80 and feeder access cone 70 shown in FIG. 13B.

The upper end of the entrance cone connector 80 can include a pair of outward extending entrance cone locking arms/wings 90, with locking arm cam 100, which can also be seen in FIGS. 21 and 23. The hollow entrance cone connector 80 can include a generally cone shape with an upper end having a wider diameter than a lower end. The narrow diameter lower end of the entrance cone 80 can include an entrance cone access opening 140, with interior walls of the entrance cone 80 having micro-steps 60 such as those previously described.

FIG. 16 is a front top perspective of the feeder assembly 10 of the preceding figures in position to attach to a hive box/container 340.

FIG. 17 is another view of the feeder assembly 10 sitting on top of, but not locked to the hive box/container 340 of FIG. 16.

FIG. 18 is another view of the feeder assembly 10 on the hive box/container 340 of FIG. 17 with the feeder assembly 10 rotating 90 degrees to lock it onto the hive box/container 340. The feeder assembly 10 can be rotated clockwise or counter-clockwise to lock it onto the hive box/container 340.

The upper end of the entrance cone connector 80 can include a pair of outward extending entrance cone locking arms/wings 90, which each can include a pair of entrance locking ramps 110.

FIG. 19 is a bottom perspective view of the feeder assembly 10 of FIG. 16 showing locking arm detail and key-way hole detail in the top lid 350 of the hive box/container 340.

FIG. 20 is a bottom perspective view of FIG. 17 showing locking entrance cone 80 of feeder assembly 10 protruding through the key-way hole 360 in the lid 350 of the hive box/container 340 and into the hive box/container 340, with the feeder assembly 10 not locked to the lid 350 of the hive box/container 340.

FIG. 21 is an enlarged view of the locking snap-in entrance cone 80 of FIG. 21. FIG. 22 is a bottom perspective view of feeder assembly 10 of FIG. 18 showing the locking arms 90 of the entrance cone 80 rotated and contacting the inside surface of the lid of the hive box. This locks the feeder assembly 10 to the lid 350 of the hive box/container 340. FIG. 23 is an enlarged view of the locked snap-in entrance cone 80 of FIG. 22.

FIG. 24 is a bottom perspective view of feeder assembly 10 of the preceding figures with non-locking entrance cone embodiment 150 in position to place on top of a hive box/container 340 with only a round hole 370 in the lid 350 and not a key-way hole 370. This feeder assembly 10 will not lock to the hive box/container 340. This feature allows the feeder assembly 10 to be used with more types of hives and different types of hive/box containers 340.

FIG. 25 is another view of the feeder assembly of FIG. 24 showing the feeder assembly 10 engaged to the hive box/container 340 with the entrance cone 150 protruding through the hive lid 350 and into the hive box/container 340 with the access cone opening 140 beneath the lid 350 of the hive box/container 340. FIG. 26 is an enlarged view of the entrance cone 150 on the feeder assembly 10 of FIG. 25.

FIG. 27 is a bottom perspective of the feeder assembly 10 of the preceding figures showing the two alternate entrance cone embodiments 80, 150.

FIG. 28 is an enlarged view of the locking entrance cone 80 of FIG. 27 assembled into the feeder access cone 70 of the feeder assembly 10.

FIG. 29 is an enlarged view of the non-locking entrance cone 150 of FIG. 27 assembled into the feeder access cone 70 of the feeder assembly 10.

FIG. 30A is a cross-sectional view of the entrance cone 80/150 attached to the feeder access cone 70 of FIG. 29 along arrows 30A. FIG. 30B is another cross-sectional view of the entrance cone 80/150 detached from the feeder access cone 70 of FIG. 30A. The upper outer edge 110 of the entrance cone 80/150 can be an entrance locking ramp which can snap fit onto and with an interior facing edge/lip 115 on the bottom end of feeder access cone 70 which locks the entrance cone 80/150 to the feeder access cone 70. A feeder access cone locating notch(es) on the bottom of the feeder access cone 70 can engage with upward protruding entrance cone locating boss(es) 120 on the entrance cone 80/150. The boss(es) 120 can orient the entrance cone 80/150 to the feeder access cone 70.

Referring to FIGS. 3-8 and 10-30B, both the hollow entrance cone connector 80/150 can include a generally cone shape with an upper end having a wider diameter than a lower end. The narrow diameter lower end of the entrance cone 80/150 can include an entrance cone access opening 140, with interior walls of the entrance cone 80/150 having micro-steps 60 such as those previously described.

FIG. 31A is a side view of stacked feeder assemblies 10 of the preceding figures. FIG. 31B is a cross-sectional view of the stacked feeder assemblies 10 of FIG. 31A along arrow 31B.

Referring to FIGS. 27 and 31A-31B, the upwardly protruding mounting bosses 200 extending upward from a lower feeder assembly cover 30 can fit within the stacking cavities 280 in the bottom surface of the bases 20 of an upper feeder assembly 10, with the bottom ends of the entrance cones 80.150 of an upper feeder assembly fitting within a stacking cavity 260 in the lid of a lower feeder assembly 10.

After a feeder assembly 10 is attached to a hive box/container 340, the travel of the bees 320 can now be described. Referring to FIGS. 13A, 13B, 14 and 15, bees 320 can initially be located in a hive frame 345 inside of a hive box/container 340. The bees 320 can enter the entrance cone access opening 140 in the entrance cone 80 and climb on the micro-steps 60 upward and as directed by the syrup barrier cup 40 can then pass over rim 72 and climb down micro-steps 60 on syrup access ladder 50 until they reach the top level of the syrup reservoir 250. The inner top surface of the cup 40 can direct the bees 320 and limits their access to the syrup 250 which prevents the bees from consuming too much syrup and/or drowning in the syrup. The bees 320 can only consume from the upper level of the syrup reservoir 250 and reverse their climb back into the hive box/container 340 to return to the hive frame 345.

Although micro-steps 60 are shown as parallel raised ribs, the climbing steps can be parallel indentations, and/or any other geometrical shaped surfaces to allow the bees 320 to climb thereon.

The novel feeder assembly components can be formed from moldable plastic materials, such as but not limited to polypropylene, polyethylene, and the like.

The base 20 can be transparent to allow the insides of the feeder assembly 10 to be visible from outside, so that the syrup level can be monitored and replenished when needed.

The cover 30 can be a reflective color, such as but not limited to white colored, to reflect sunlight and prevent the inside of the feeder assembly 10 for overheating while placed in the sun. The base 20 and cover 30 can be UV (ultraviolet) treated to lengthen the lifespan of the feeder assembly 10.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A top feeder assembly for a hive, comprising:
a feeder housing having a base and a separate cover, the separate cover attaching to the base;
a hollow feeder access cone having a narrow diameter lower end adjacent to a central opening through a bottom floor inside of the base, and a wider upper end that has a diameter wider than the narrow diameter lower end, the hollow feeder access cone having interior walls with ridges along an interior surface;
a separate angled interior wall having an upper end adjacent to the wider upper end of the hollow feeder access cone, and a lower end sloping away from the central opening inside of the base, the separate angled interior wall having raised ridges on an upper surface;
a hollow entrance cone connector extending below the housing having an upper end adjacent to the central opening in a bottom of the base, and an opposite narrower width lower end extending away from the bottom of the base, the opposite narrower width lower end being narrower than the upper end of the hollow entrance cone connector, the entrance cone connector having raised ridges along an interior surface; and
liquid syrup inside of the base having a level below the upper end of the hollow feeder access cone, wherein the hollow entrance cone connector is adapted to fit on a top of a hive box so that bees can pass into and out of the feeder housing to access the syrup.

2. The top feeder assembly of claim 1, wherein the cover and the base have perimeter edges which mateably snap together to form the housing.

3. The top feeder assembly of claim 1, further comprising:
a barrier cup having a generally closed top, closed sides and an open bottom which is sized to fit over the hollow feeder access cone and the separate angled interior wall and is held in place by the cover of the housing.

4. The top feeder assembly of claim 3, wherein the barrier cup includes vent holes in the barrier cup.

5. The top feeder assembly of claim 3, further comprising:
members to raise the barrier cup over the bottom floor of the base so as to allow the syrup to flow into the cup to achieve a level of syrup inside the cup that is similar to a level of syrup outside the cup.

6. The top feeder assembly of claim 5, wherein the members include standoff ribs between a bottom edge of the cup and the bottom floor of the base.

7. The top feeder assembly of claim 1, wherein the separate cover includes:
a generally central located stacking cavity in the separate cover of the feeder housing, the generally central located stacking cavity sized to fit a second hollow entrance cone connector extending below a second feeder housing, the second feeder housing being identical to the feeder housing, and the second hollow entrance cone being identical to the hollow entrance cone, so that the second feeder housing with the second hollow entrance cone connector is stackable on top of the feeder housing.

8. The top feeder assembly of claim 7, wherein the generally central located stacking cavity includes:
a drain channel in the generally central located stacking cavity which allows water to drain away from the feeder assembly.

9. The top feeder assembly of claim 8, further comprising:
a lower ledge surface in the cover below the drain channel, the lower ledge surface having a fill opening therein.

10. The top feeder assembly of claim 1, further comprising:
a removable plug insertable into a fill hole in the separate cover for allowing the syrup to be poured into the feeder housing.

11. The top feeder assembly of claim 10, wherein the removable plug includes:
a strap for securing the plug to the feeder housing when the plug is removed from the fill hole in the separate cover.

12. The top feeder assembly of claim 1, further comprising:
notches along the lower end of the feeder access cone; and
upper clip edges on the upper end of the hollow entrance cone connector for connecting to the notches on the lower end of the feeder access cone.

13. The top feeder assembly of claim 12, further comprising:
outwardly extending locking wings which extend sideways from the hollow entrance cone connector below the upper clip edges.

14. The top feeder assembly of claim 1, further comprising:
a separate shade panel attachable to and detachable from the cover of the housing for providing shade to the housing when the housing is exposed to sunlight.

15. The top feeder assembly of claim 14, further comprising:
openings and bosses which mateably attach to one another for allowing the shade panel to be attached to the cover of the housing.

16. The top feeder assembly of claim 1, wherein the cover has a reflective color to prevent overheating inside of the housing when exposed to the sun, and the base has transparent walls in order to monitor the syrup level inside.

17. A top feeder assembly for use with hive boxes, comprising in combination:
a feeder housing having a base and a separate cover, the separate cover attaching to the base;
a hollow feeder access cone having a narrow diameter lower end adjacent to a central opening through a bottom floor inside of the base, and a wider upper end that has a diameter wider than the narrow diameter lower end, the hollow feeder access cone having interior walls with ridges along an interior surface;
a separate angled interior wall having an upper end adjacent to the wider upper end of the hollow feeder access cone, and a lower end sloping away from the central opening inside of the base, the separate angled interior wall having raised ridges on an upper surface;
a hollow entrance cone connector extending below the housing having an upper end adjacent to the central opening in a bottom of the base, and an opposite narrower width lower end extending away from the bottom of the base, the opposite narrower width lower end being narrower than the upper end of the hollow entrance cone connector, the entrance cone connector having raised ridges along an interior surface;

liquid syrup inside of the base having a level below the upper end of the hollow feeder access cone, wherein the hollow entrance cone connector is adapted to fit on a top of a hive box so that bees can pass into and out of the feeder housing to access the syrup;

notches along the lower end of the feeder access cone;

upper clip edges on the upper end of the hollow entrance cone connector for connecting to the notches on the lower end of the feeder access cone;

outwardly extending locking wings which extend sideways from the hollow entrance cone connector below the upper clip edges, and a hive box with a lid for mounting the top feeder assembly housing onto a mateable opening in the lid of the hive box, the mateable opening having a generally cylindrical shape with side extending notches sized to receive the locking wings extending sideways from the hollow access cone connector, wherein the lower end of the hollow access cone connector with the locking wings being insertable into the mateable opening in the lid of the hive box, and followed by rotating the hive box locks the hive box to the housing of the top feeder assembly.

* * * * *